US008534115B2

(12) United States Patent
Tomiyama et al.

(10) Patent No.: US 8,534,115 B2
(45) Date of Patent: Sep. 17, 2013

(54) SYSTEMS AND METHODS OF DETERMINING PARAMETER VALUES IN A DOWNHOLE ENVIRONMENT

(75) Inventors: Kozue Tomiyama, Hino (JP); Toru Terabayashi, Sagamihara (JP); Hideyuki Kamei, Yokohama (JP); Takenori Motoki, Yokohama (JP); Tetsuya Tanaka, Yokohama (JP); Martine Hori, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 172 days.

(21) Appl. No.: 13/274,352

(22) Filed: Oct. 17, 2011

(65) Prior Publication Data

US 2013/0091944 A1    Apr. 18, 2013

(51) Int. Cl.
*G01D 18/00* (2006.01)
*G01L 27/00* (2006.01)
*G01K 15/00* (2006.01)

(52) U.S. Cl.
USPC ............ 73/1.88; 73/1.01; 702/86; 702/88; 702/98; 702/99

(58) Field of Classification Search
USPC ............ 73/1.02, 1.57, 1.88; 702/85–88, 702/98, 99
See application file for complete search history.

(56) References Cited

U.S. PATENT DOCUMENTS

| | | | | |
|---|---|---|---|---|
| 3,957,373 A | * | 5/1976 | Clarke | 356/300 |
| 4,235,102 A | * | 11/1980 | Karlsson et al. | 73/862.41 |
| 4,725,784 A | * | 2/1988 | Peled et al. | 324/427 |
| 5,959,731 A | * | 9/1999 | Jones | 356/503 |
| 6,430,989 B1 | * | 8/2002 | Van Dyke et al. | 73/45.5 |
| 6,707,556 B2 | * | 3/2004 | Turner et al. | 356/436 |
| 7,114,562 B2 | | 10/2006 | Fisseler et al. | |
| 7,469,574 B2 | * | 12/2008 | Kawanishi et al. | 73/61.46 |
| 8,101,062 B2 | * | 1/2012 | Deng | 205/777.5 |
| 8,437,825 B2 | * | 5/2013 | Dalvi et al. | 600/344 |
| 2005/0010106 A1 | * | 1/2005 | Lang et al. | 600/425 |
| 2006/0276984 A1 | * | 12/2006 | Kobe et al. | 702/75 |
| 2009/0008079 A1 | * | 1/2009 | Zazovsky et al. | 166/60 |
| 2009/0076738 A1 | * | 3/2009 | Kayihan et al. | 702/25 |
| 2010/0030041 A1 | * | 2/2010 | Bruinsma et al. | 600/322 |
| 2010/0154529 A1 | * | 6/2010 | Terabayashi et al. | 73/152.27 |
| 2010/0192684 A1 | * | 8/2010 | Wu et al. | 73/152.55 |
| 2010/0313647 A1 | * | 12/2010 | Terabayashi et al. | 73/152.55 |

\* cited by examiner

*Primary Examiner* — David A Rogers
(74) *Attorney, Agent, or Firm* — Jianguang Du; Jody DeStefanis

(57) ABSTRACT

Systems and methods of determining parameter values in a downhole environment are described. An example method of determining a parameter value using calibration information is described. The calibration information corresponding to different parameter ranges in a downhole environment. The method includes determining a parameter range in the downhole environment using a controller and obtaining first calibration information or second calibration information based on the parameter range. The first calibration information associated with a first parameter range and the second calibration information associated with a second parameter range. The method also includes receiving an output signal from a sensor associated with the parameter and using the obtained calibration information to determine the parameter value based on the output signal received.

18 Claims, 9 Drawing Sheets

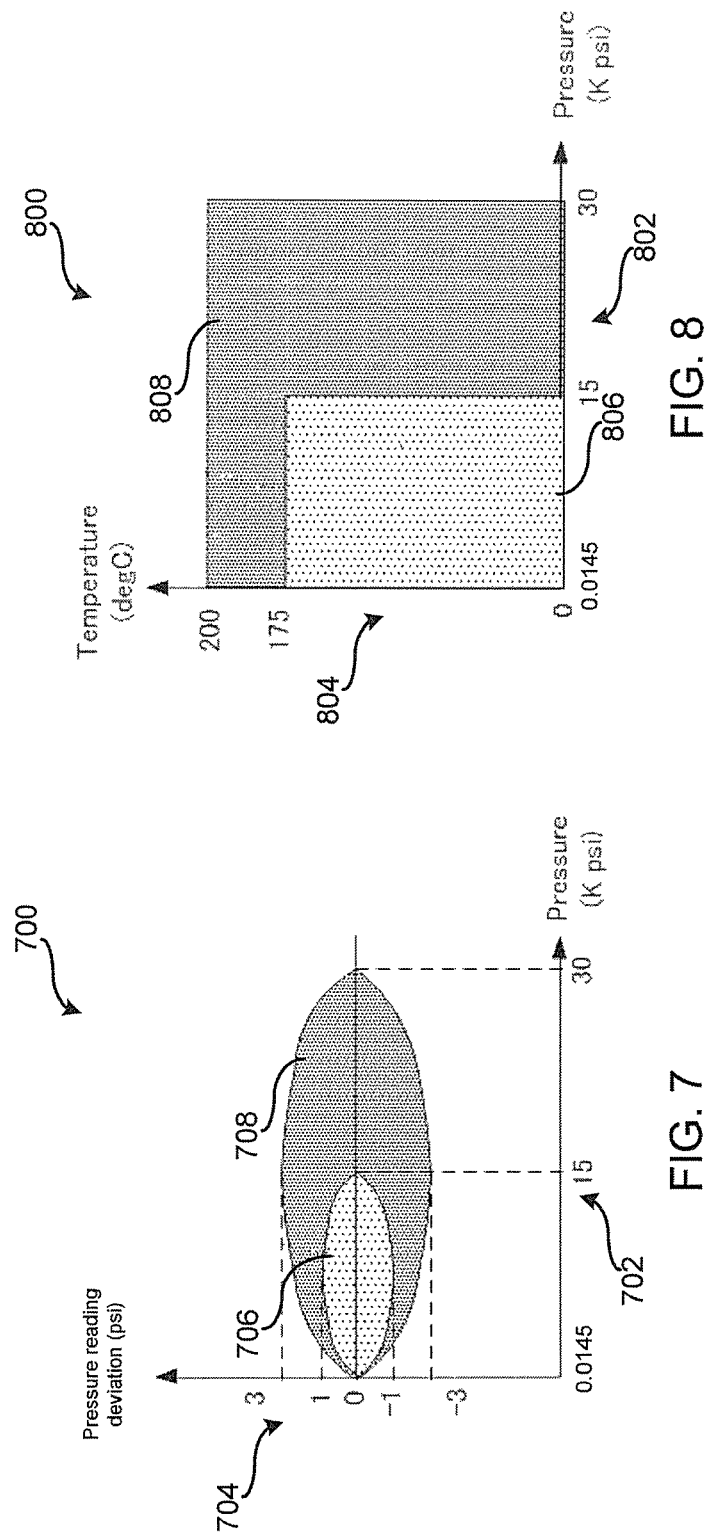

SYSTEMS AND METHODS OF DETERMINING PARAMETER VALUES IN A DOWNHOLE ENVIRONMENT

BACKGROUND

Measurements are sometimes taken downhole when drilling for and/or producing hydrocarbons. In some instances, a calibration coefficient is used when determining a parameter value based on the measurements taken.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method of determining a parameter value using calibration information is described. The calibration information corresponding to different parameter ranges in a downhole environment. The method includes determining a parameter range in the downhole environment using a controller and obtaining first calibration information or second calibration information based on the parameter range. The first calibration information is associated with a first parameter range and the second calibration information is associated with a second parameter range. The method also includes receiving an output signal from a sensor associated with the parameter and using the obtained calibration information to determine the parameter value based on the output signal received.

An example system to determine a parameter value in a downhole environment includes a controller and a sensor. At least one of the controller or the sensor is associated with a first calibration coefficient and a second calibration coefficient. The first calibration coefficient corresponding to a first parameter range and the second calibration coefficient corresponding to a second parameter range different from the first parameter range. Based on a parameter range of the downhole environment, the controller is to select one of the first calibration coefficient or the second calibration coefficient to be applied to an output signal received from the sensor to determine the parameter value. The output signal is associated with the parameter.

An example downhole tool includes a controller disposed within a body of the downhole tool and a sensor. At least one of the controller or the sensor is associated with a first calibration coefficient and a second calibration coefficient. The first calibration coefficient including a first parameter range and the second calibration coefficient including a second parameter range different from the first parameter range. Based on a parameter range of the downhole environment, the controller is to select one of the first calibration coefficient or the second calibration coefficient to be applied to an output signal received from the sensor to determine a parameter value. The output signal is associated with the parameter.

FIGURES

Embodiments of systems and methods of determining parameter values in a downhole environment are described with reference to the following figures. The same numbers are used throughout the figures to reference like features and components.

FIG. 7 is a chart that plots pressure as a function of pressure reading deviation.

FIGS. 8-10 depict various charts that plot pressure as a function of temperature and illustrate different parameter ranges.

DETAILED DESCRIPTION

Figure 1:
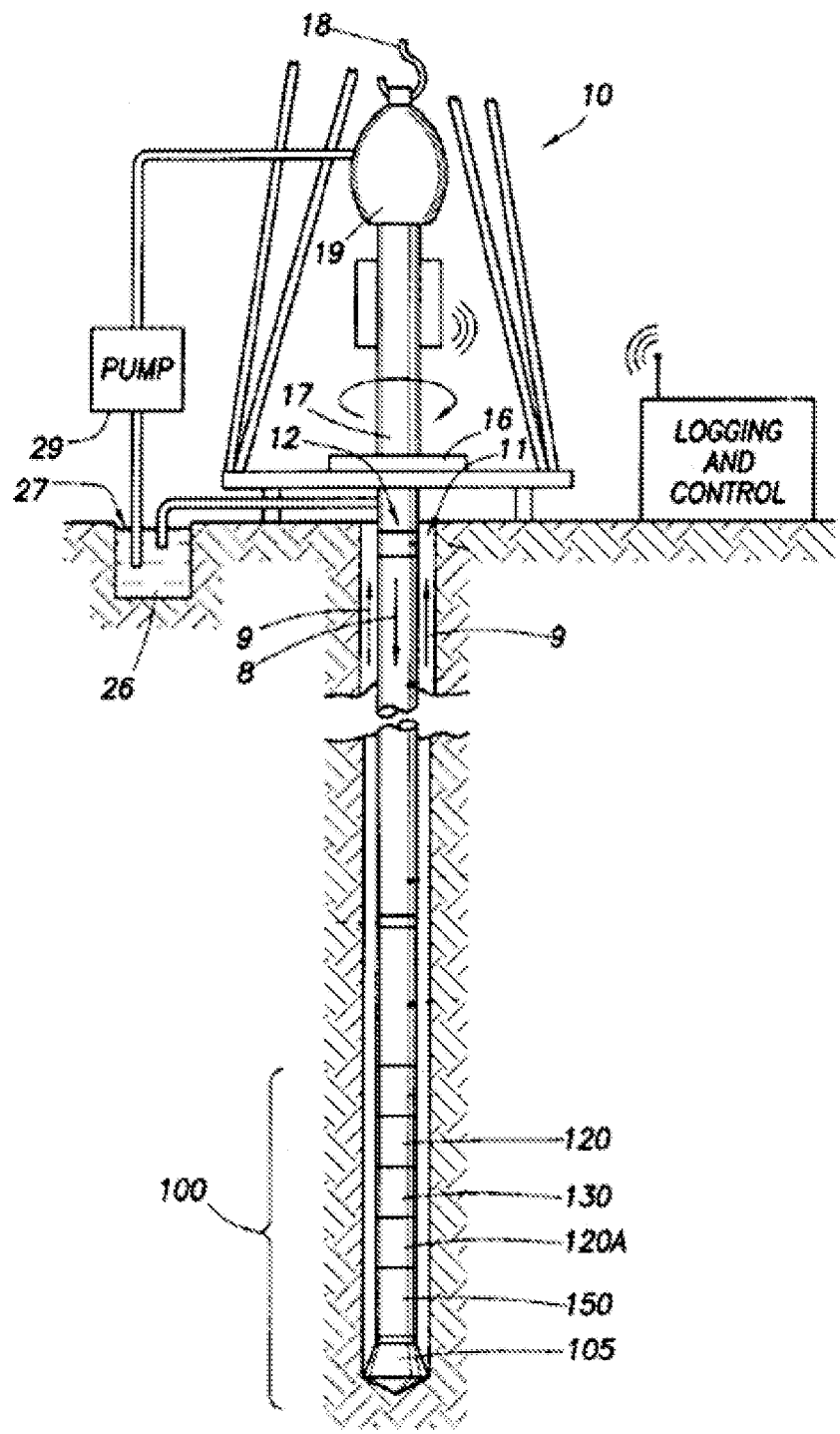
FIG. 1 illustrates an example system in which embodiments of the systems and methods of determining parameter values in a downhole environment can be implemented.

In the following detailed description, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

The example systems and methods described herein enable more accurate measurements to be obtained in wellbores having various parameter ranges. Some sensors use the same calibration information regardless of the parameter range of the wellbore. For example, the same calibration information may be used to determine a pressure value based on a sensor output signal regardless of whether the parameter range of the wellbore is a broad parameter range or a narrow parameter range. Due to measurement hysteresis, using the same calibration information for all parameter ranges may result in lower accuracy of the values determined.

Using the examples described herein, different calibration information is used depending on the parameter range of the wellbore to substantially ensure the determination of higher accuracy of measured parameter values (e.g., pressure values). In some examples, first calibration information (e.g., a first set of calibration coefficients) may be associated with a first parameter range and second calibration information (e.g., a second set of calibration coefficients) may be associated with a second parameter range. The parameter ranges may be different pressure and/or temperature ranges of the wellbore. The first parameter range may be associated with a first temperature and/or pressure range and the second parameter range may be associated with a second temperature and/or pressure range. The first parameter range may be smaller or different than the second parameter range and the parameter ranges may at least partially overlap or may be substantially non-overlapping.

Depending on the parameter range of the wellbore, the first or second calibration information may be used, along with a sensor output signal, to determine a parameter value. Based on knowledge of the wellbore and/or a wellbore parameter range, an operator and/or a controller may select or input which of the first or second calibration information is to be used in determining a parameter value. If the controller is used to select the first or second calibration information, the controller may automatically select which of the first or second calibration information is used to determine the parameter value. The controller may be entirely up hole, partially up hole and partially downhole, or entirely downhole.

In some examples, a single sensor may be used to obtain a measurement associated with a parameter(s) of the wellbore and, based on the parameter range of the wellbore and the corresponding calibration information, a parameter value may be determined based on the sensor output signal. Alternatively, a plurality of sensors (e.g., micrometer-size pressure sensor probes) may be used. Each of the sensors corresponds to particular calibration information. In such examples, based on the parameter range of the wellbore, the sensor corresponding to the parameter range of the wellbore may be selected to obtain a measurement associated with the parameter and, based on the sensor output signal and the calibration information, a parameter value may be determined. Calibration information may be determined for the different parameter ranges (e.g., different pressure and/or temperature ranges) by calibrating the sensor(s) and determining the calibration information therefrom.

The examples described herein may be employed in various downhole environments and/or in connection with various downhole tools. Some downhole tools in which the examples described herein may be employed include a wireline formation tester.

FIG. 1 illustrates a wellsite system in which the examples described herein can be employed. The wellsite can be onshore or offshore. In this example system, a borehole 11 is formed in subsurface formations by rotary drilling in a manner that is well known. However, the examples described herein can also use directional drilling, as will be described hereinafter.

A drill string 12 is suspended within the borehole 11 and has a bottom hole assembly 100 which includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16 and energized by means not shown, which engages the kelly 17 at the upper end of the drill string 12. The drill string 12 is suspended from the hook 18, attached to a traveling block (also not shown), through the kelly 17 and the rotary swivel 19 which permits rotation of the drill string 12 relative to the hook 18. As is well known, a top drive system could alternatively be used.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In this example, the LWD module 120 includes a fluid sampling device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may include a mud turbine generator powered by the flow of the drilling fluid 26, it being understood that other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
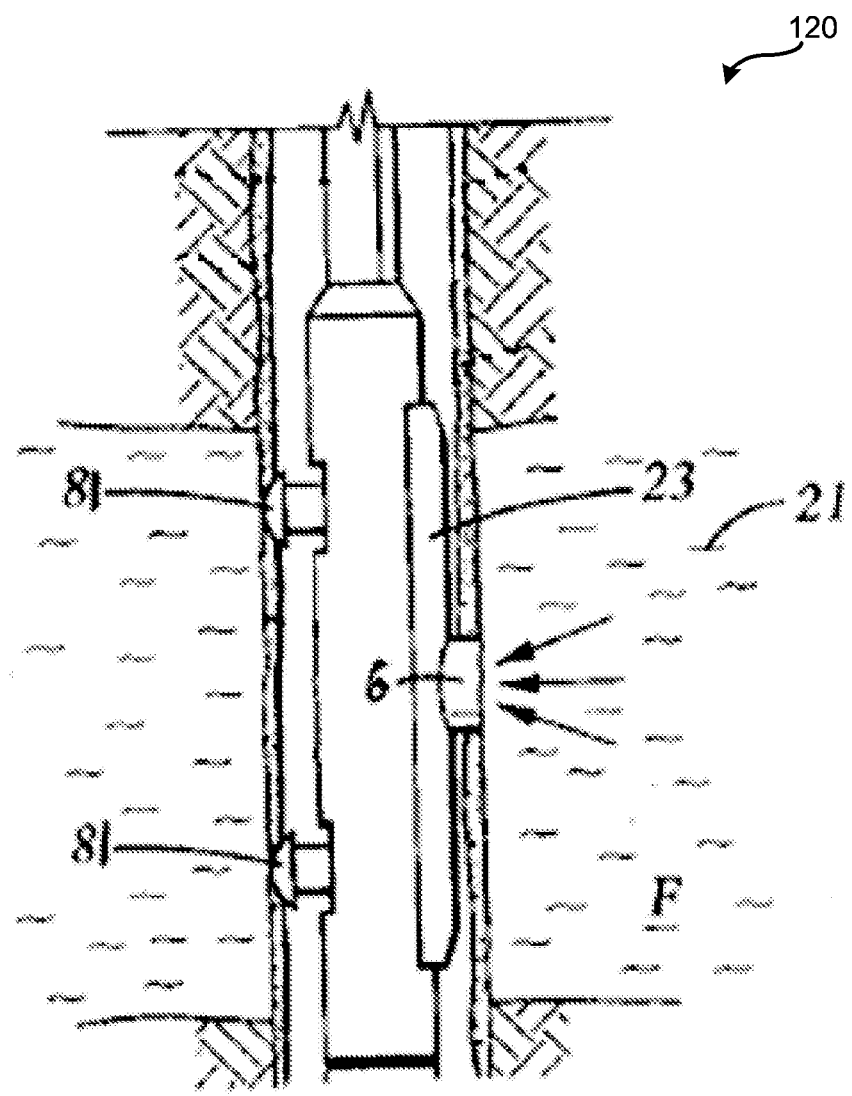
FIG. 2 illustrates another example system in which embodiments of the systems and methods of determining parameter values in a downhole environment can be implemented.

FIG. 2 is a simplified diagram of a sampling-while-drilling logging device of a type described in U.S. Pat. No. 7,114,562, incorporated herein by reference, utilized as the LWD tool 120 or part of an LWD tool suite 120A. The LWD tool 120 is provided with a probe 6 for establishing fluid communication with the formation and drawing the fluid 21 into the tool, as indicated by the arrows. The probe 6 may be positioned in a stabilizer blade 23 of the LWD tool 120 and extended therefrom to engage the borehole wall. The stabilizer blade 23 comprises one or more blades that are in contact with the borehole wall. Fluid drawn into the downhole tool using the probe 6 may be measured to determine, for example, pretest and/or pressure parameters. Additionally, the LWD tool 120 may be provided with devices, such as sample chambers, for collecting fluid samples for retrieval at the surface. Backup pistons 81 may also be provided to assist in applying force to push the drilling tool and/or probe against the borehole wall.

Figure 3:
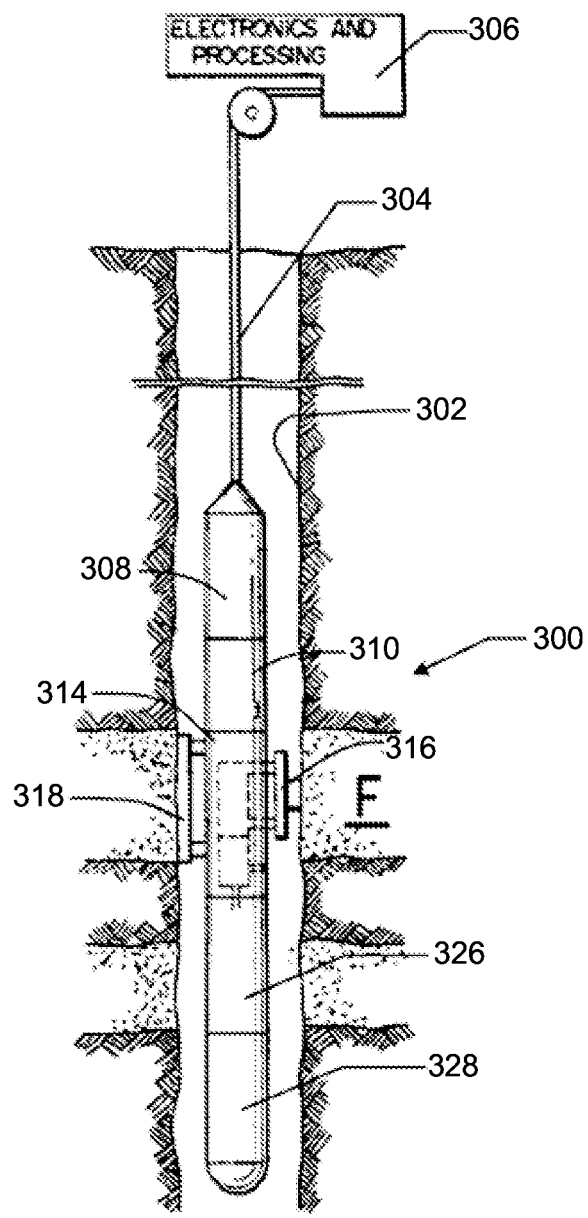
FIG. 3 illustrates another example system in which embodiments of the systems and methods of determining parameter values in a downhole environment can be implemented.

FIG. 3 depicts an example wireline tool 300 that may be another environment in which aspects of the present disclosure may be implemented. The example wireline tool 300 is suspended in a wellbore 302 from the lower end of a multi-conductor cable 304 that is spooled on a winch (not shown) at the Earth's surface. At the surface, the cable 304 is communicatively coupled to an electronics and processing system 306. The example wireline tool 300 includes an elongated body 308 that includes a formation tester 314 having a selectively extendable probe assembly 316 and a selectively extendable tool anchoring member 318 that are arranged on opposite sides of the elongated body 308. Additional components (e.g., 310) may also be included in the tool 300.

The extendable probe assembly 316 may be configured to selectively seal off or isolate selected portions of the wall of the wellbore 302 to fluidly couple to the adjacent formation F and/or to draw fluid samples from the formation F. Accordingly, the extendable probe assembly 316 may be provided with a probe having an embedded plate, as described above.

The formation fluid may be expelled through a port (not shown) or it may be sent to one or more fluid collecting chambers 326 and 328. In the illustrated example, the electronics and processing system 306 and/or a downhole control system are configured to control the extendable probe assembly 316 and/or the drawing of a fluid sample from the formation F.

Figure 4:
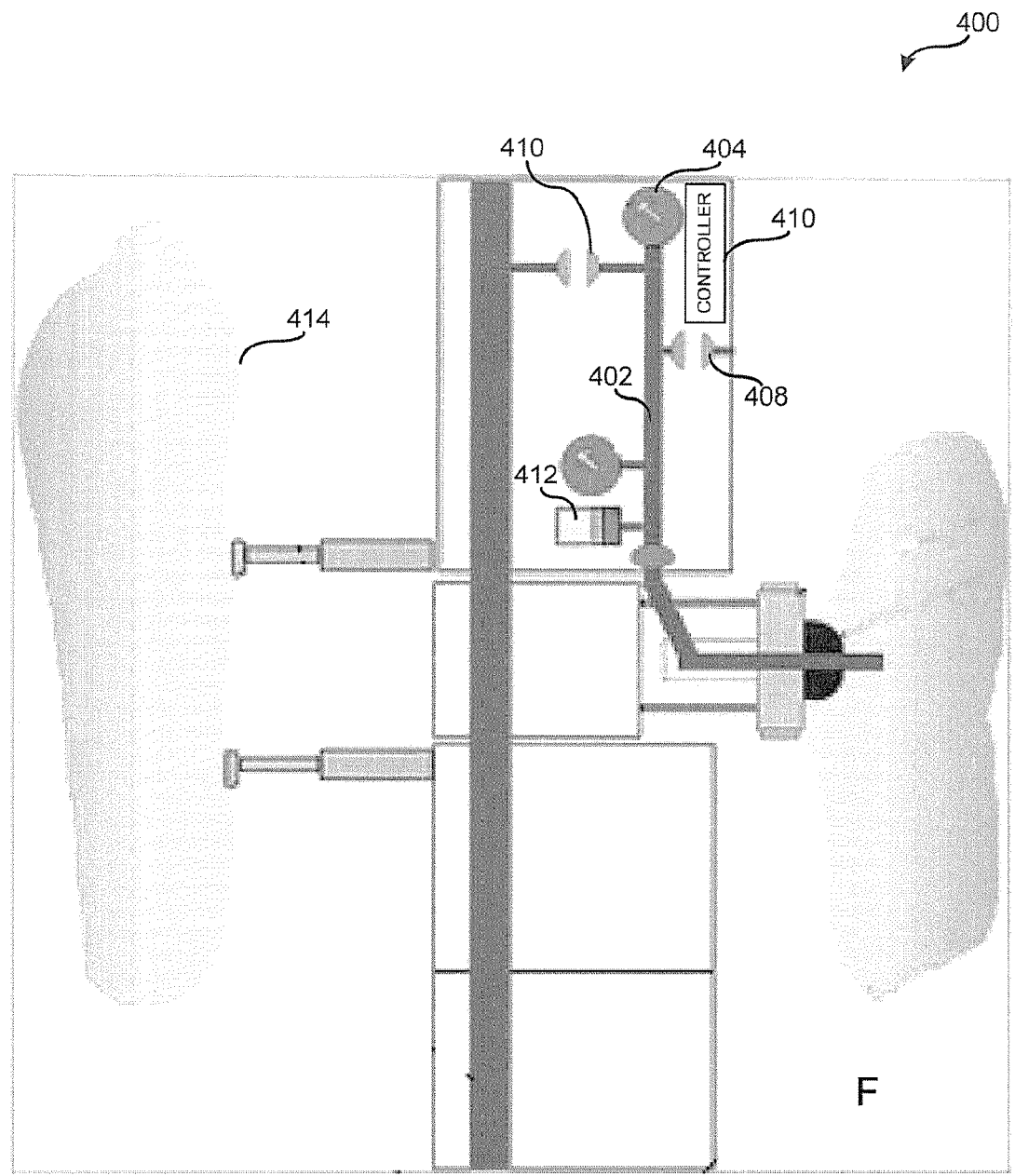
FIG. 4 illustrates another example system in which embodiments of the systems and methods of determining parameter values in a downhole environment can be implemented.

FIG. 4 depicts a portion (e.g., a probe module) of an example downhole tool (e.g., a formation tester tool) 400. The downhole tool 400 includes a flowline 402, a pressure sensor 404, a controller 406 and a plurality of valves 408 and 410. While the controller 406 is depicted downhole, the controller 406 may be partially or fully positioned up hole or at another location within the downhole tool 400.

To determine a pressure of the formation F, the valves 408 and 410 are closed and formation fluid is drawn into the flowline 402 from the formation F using a piston assembly (e.g., pretest piston) 412. When the pressure inside the piston assembly 412 is substantially the same as the pressure of the formation F, the pressure sensor 404 may measure the pressure of the formation fluid within the flowline 402 and generate an output signal associated therewith. To determine a pressure value of the formation fluid within the flowline 402, one or more calibration coefficients associated with a parameter range of a wellbore 414 may be applied to the output signal of the pressure sensor 404.

In some examples, a first parameter range is associated with a first calibration coefficient(s) and a second parameter range is associated with a second calibration coefficient(s). The first parameter range and corresponding calibration coefficient(s) may be associated with a temperature range of between about 0-175° C. and a pressure range of between about 1 atom (i.e., 14.5 psi)-15K psi, a temperature range of between about 0-200° C. and a pressure range of between about 1 atom (i.e., 14.5 psi)-15K psi and/or a temperature range of between about 0-175° C. and a pressure range of between about 1 atom (i.e., 14.5 psi)-30K psi. The second parameter range and corresponding calibration coefficient(s) may be associated with a temperature range of between about 175-200° C. and a pressure range of between about 1 atom (i.e., 14.5 psi)-15K psi and a temperature range of between about 0-200° C. and a pressure range of between about 15-30K psi, a temperature range of between about 0-200° C. and a pressure range of between about 15-30K psi, a temperature range of between about 175-200° C. and a pressure range of between about 1 atom (i.e., 14.5 psi)-30K psi. While the above example describes a first parameter range and a second parameter range, any number of parameter ranges (e.g., 2, 3, 4, etc.) having corresponding calibration coefficients (e.g., 2, 3, 4, etc.) may be used instead.

In some examples, based on a parameter range of the wellbore 414, the controller 406 may select one of the calibration coefficients to be used to determine a pressure value of the formation fluid within the flowline 402 based on an output signal received from the pressure sensor 404. In other examples, based on a parameter range of the wellbore 414, the controller 406 may select one of a plurality of sensor probes of the pressure sensor 404 to obtain a pressure measurement of the fluid within the flowline 402. Each of the sensor probes of the pressure sensor 404 may be associated with a parameter range of the wellbore and have a corresponding calibration coefficient(s) associated therewith. Thus, the output signal of the selected sensor probe and corresponding calibration coefficient may be used to determine a pressure value of the formation fluid within the flowline 402.

Figure 5:
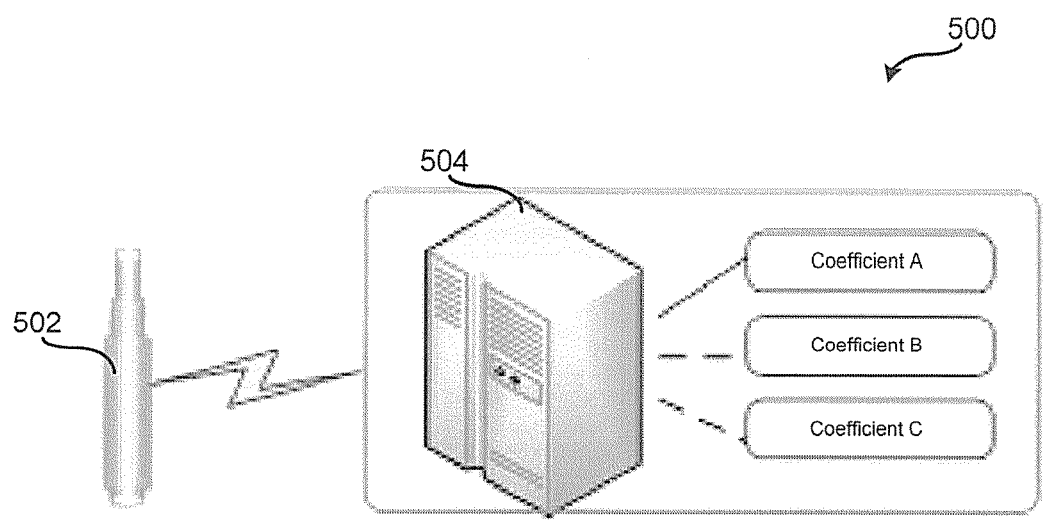
FIG. 5 illustrates various components of an example device that can implement embodiments of the systems and methods of determining parameter values in a downhole environment.

FIG. 5 depicts an example system 500 that may be used to implement the examples described herein. The system 500 includes a sensor (e.g., a pressure sensor) 502 and a controller 504. The sensor 502 may be used to measure a parameter of a formation fluid and generate an output signal associated therewith. The controller 504 may be used to determine a parameter range of the wellbore in which the sensor 502 is positioned and to obtain (e.g., receive, select) a calibration coefficient based thereon. In this example, the controller 504 includes three sets of calibration information and/or coefficients (e.g., Coefficient A, Coefficient B and Coefficient C). The calibration information corresponds to different parameter ranges of the wellbore bore in which the sensor 502 is positioned. In practice, based on the parameter range of the wellbore, the controller 504 may use the corresponding calibration coefficient and output signal from the sensor 502 to determine a parameter value of the formation fluid.

Figure 6:
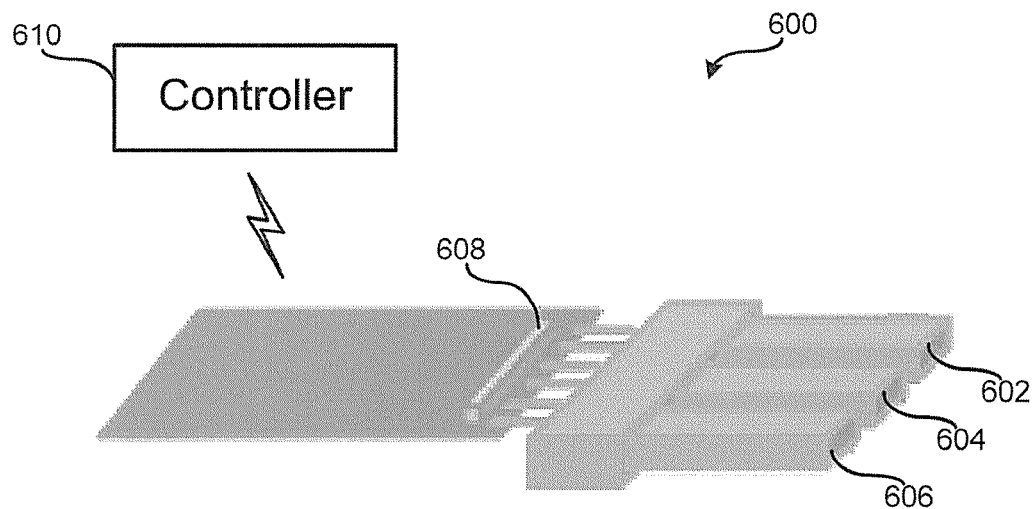
FIG. 6 illustrates various components of an example device that can implement embodiments of the systems and methods of determining parameter values in a downhole environment.

FIG. 6 depicts an example gauge (e.g., pressure gauge) or system 600 that may be used to implement the examples described herein. The gauge 600 includes a first probe and/or sensor 602, a second probe and/or sensor 604, a third probe and/or sensor 606, a switch 608 and a controller 610. The first probe 602 may be associated with a first parameter range and corresponding calibration information, the second probe 604 may be associated with a second parameter range and corresponding calibration information and the third probe 606 may be associated with a third parameter range and corresponding calibration information. Based on the parameter range of the wellbore, the controller 610 and/or the switch 608 may select one of the probes 602, 604 or 606 to obtain a parameter measurement and generate an output signal associated therewith. Each of the probes 602, 604 and/or 606 may be associated with a parameter range and a corresponding calibration coefficient(s). Thus, the output signal of the selected probe 602, 604 and/or 606 and corresponding calibration coefficient may be used to determine a parameter value.

FIG. 7 depicts an example graph 700 depicting pressure gauge calibration errors. The x-axis 702 relates to pressure and the y-axis 704 relates to pressure reading deviation (e.g., hysteresis and/or error). A first parameter range 706 relates to calibration error for a temperature range of between about 0-175° C. and a pressure range of between about 1 atom (i.e., 14.5 psi)-15K psi. A second parameter range 708 relates to calibration error for a temperature range of between about 0-200° C. and a pressure range of between about 1 atom (i.e., 14.5 psi)-30K psi. As shown, the first parameter range 706, which corresponds to first calibration information, has a pressure reading deviation of +/−1 psi and the second parameter range 708, which corresponds to second calibration information, has a pressure reading deviation of +/−3 psi.

Thus, if a wellbore being tested has a temperature of between about 0-175° C. and a pressure of between about 1 atom (i.e., 14.5 psi)-15K psi, the first calibration information may be selected to be used with the output signals of the pressure gauge to determine a pressure value of the wellbore and/or formation fluid therein. Alternatively, if the wellbore being tested has a temperature range of between about 0-200° C. and a pressure of between about 1 atom (i.e., 14.5 psi)-30K psi, the second calibration information may be selected to be used along with the output signals of the pressure gauge to determine a pressure value of the wellbore and/or formation fluid therein.

FIG. 8 depicts an example graph 800 of calibration ranges. The x-axis 802 relates to pressure and the y-axis 804 relates to temperature. A first parameter range 806 corresponds to first calibration information and/or a coefficient and a second parameter range 808 corresponds to second calibration information and/or a coefficient. The first parameter range 806 corresponds to a temperature range of between about 0-175°

C. and a pressure range of between about 1 atom (i.e., 14.5 psi)-15K psi. The second parameter range 808 corresponds to a temperature range of between about 175-200° C. and a pressure range of between about 1 atom (i.e., 14.5 psi)-15K psi and a temperature range of between about 0-200° C. and a pressure range of between about 15-30K psi.

Thus, if the wellbore being tested has a temperature range of between about 0-175° C. and a pressure range of between about 1 atom (i.e., 14.5 psi)-15K psi, the first calibration information may be selected to be used with the output signals of the pressure gauge to determine a pressure value of the wellbore and/or formation fluid therein. Alternatively, if the wellbore being tested has a temperature range of between about 175-200° C. and a pressure range of between about 1 atom (i.e., 14.5 psi)-15K psi and/or a temperature range of between about 0-200° C. and a pressure range of between about 15-30K psi, the second calibration information may be selected to be used along with the output signals of the pressure gauge to determine a pressure value of the wellbore and/or formation fluid therein.

Figure 9:
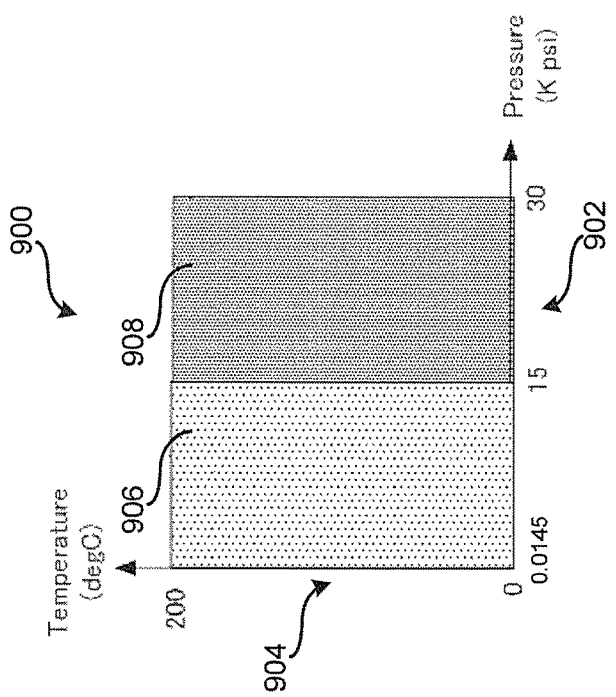

FIG. 9 depicts an example graph 900 of calibration ranges. The x-axis 902 relates to pressure and the y-axis 904 relates to temperature. A first parameter range 906 corresponds to first calibration information and/or a coefficient and second parameter range 908 corresponds to second calibration information and/or a coefficient. The first parameter range 906 corresponds to a temperature range of between about 0-200° C. and a pressure range of between about 1 atom (i.e., 14.5 psi)-15K psi. The second parameter range 908 corresponds to a temperature range of between about 0-200° C. and a pressure range of between about 15-30K psi.

Thus, if the wellbore being tested has a temperature range of between about 0-200° C. and a pressure range of between about 1 atom (i.e., 14.5 psi)-15K psi, the first calibration information may be selected to be used with the output signals of the pressure gauge to determine a pressure value of the wellbore and/or formation fluid therein. Alternatively, if the wellbore being tested has a temperature range of between about 0-200° C. and a pressure range of between about 15-30K psi, the second calibration information may be selected to be used along with the output signals of the pressure gauge to determine a pressure value of the wellbore and/or formation fluid therein.

Figure 10:
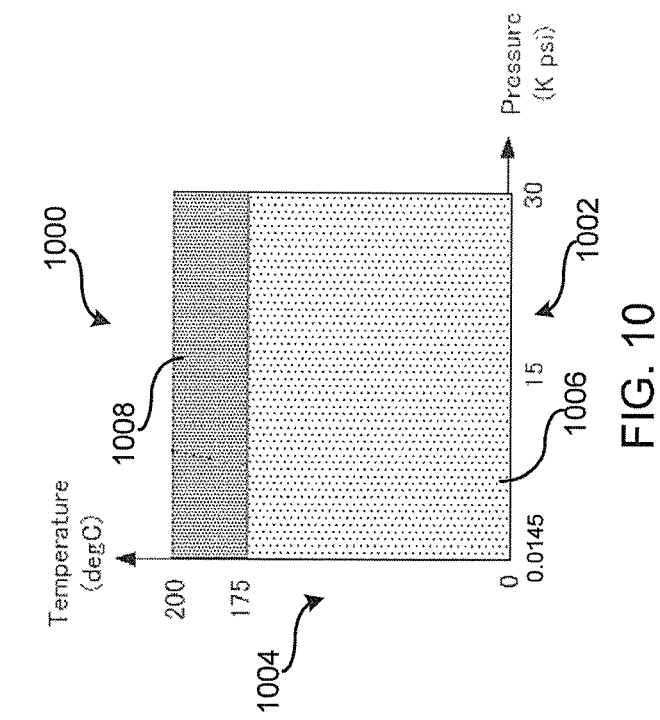

FIG. 10 depicts an example graph 1000 of calibration ranges. The x-axis 1002 relates to pressure the y-axis 1004 relates to temperature. A first parameter range 1006 corresponds to a first calibration information and/or a coefficient and a second parameter range 1008 corresponds to a second calibration information and/or a coefficient. The first parameter range 1006 corresponds to a temperature range of between about 0-175° C. and a pressure range of between about 1 atom (i.e., 14.5 psi)-30K psi. The second parameter range 1008 corresponds to a temperature range of between about 175-200° C. and a pressure range of between about 1 atom (i.e., 14.5 psi)-30K psi.

Thus, if the wellbore being tested has a temperature range of between about 0-175° C. and a pressure range of between about 1 atom (i.e., 14.5 psi)-30K psi, the first calibration information may be selected to be used with the output signals of the pressure gauge to determine a pressure value of the wellbore and/or formation fluid therein. Alternatively, if the wellbore being tested has a temperature range of between about 175-200° C. and a pressure range of between about 1 atom (i.e., 14.5 psi)-30K psi, the second calibration information may be selected to be used along with the output signals of the pressure gauge to determine a pressure value of the wellbore and/or formation fluid therein.

Figure 11:
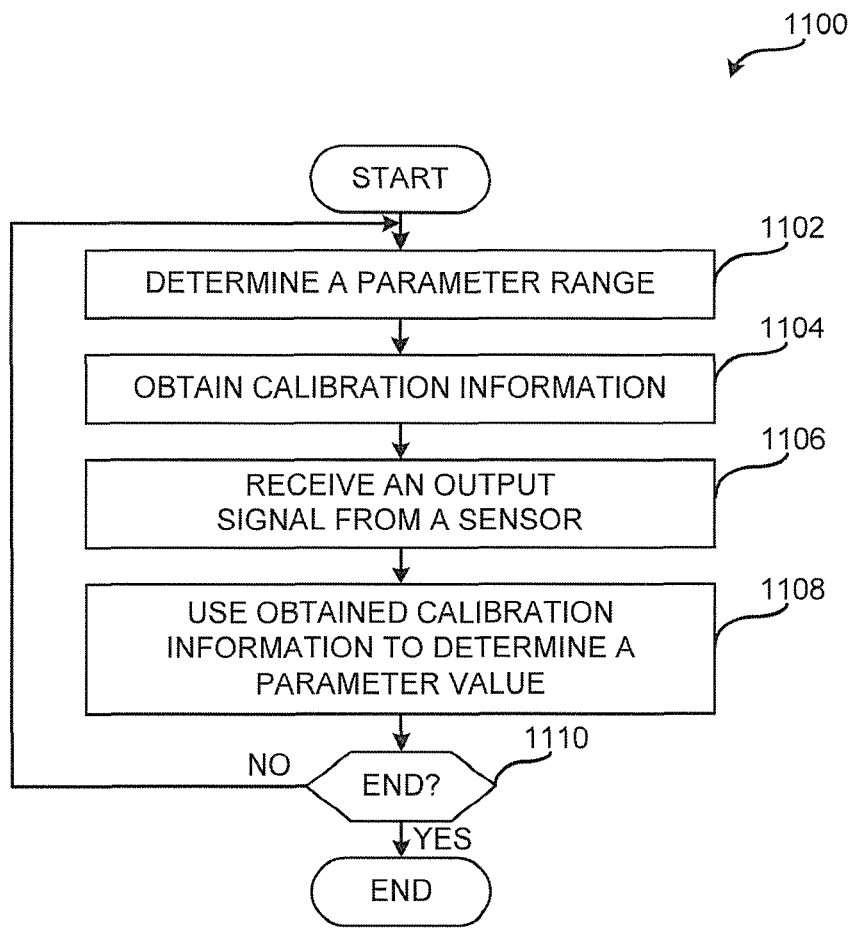
FIG. 11 illustrates an example method for determining parameter values in a downhole environment.

FIG. 11 depicts an example flow diagram representative of processes that may be implemented using, for example, computer readable and executable instructions that may be used to accurately determine parameter values in a wellbore. The example processes of FIG. 11 may be performed using a processor, a controller and/or any other suitable processing device. For example, the example processes of FIG. 11 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 11 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 11 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 11 may be implemented manually or as any combination(s) of any of the foregoing techniques, for example, any combination of firmware, software, discrete logic and/or hardware. Further, although the example processes of FIG. 11 are described with reference to the flow diagram of FIG. 11, other methods of implementing the processes of FIG. 11 may be employed. For example, the order of execution of the blocks may be changed, and/or some of the blocks described may be changed, eliminated, sub-divided, or combined. Additionally, any or all of the example processes of FIG. 11 may be performed sequentially and/or in parallel by, for example, separate processing threads, processors, devices, discrete logic, circuits, etc.

FIG. 11 depicts an example method 1100 related to determining a parameter value, such as a pressure value, using a calibration information. The calibration information corresponds to different parameter ranges in a downhole environment. The method 1100 may begin by determining a parameter range in the downhole environment such as a wellbore (block 1102). The parameter range may be determined by knowledge of the downhole environment, adjacent boreholes, measurements, etc. The parameter range may relate to a temperature and/or pressure range of the wellbore. The method 1100 may then obtain calibration information (e.g., first calibration information and/or coefficient(s), second calibration information and/or coefficient (s)) based on the parameter range of the wellbore (block 1104).

The first calibration information may be associated with a first parameter range (e.g., a first pressure and/or temperature range) and the second calibration information may be associated with a second parameter range (e.g., a second pressure and/or temperature range). The first calibration information may be associated with a first sensor and the second calibration information may be associated with a second sensor. The first parameter range may be smaller and/or different than the second parameter. The first and second parameter ranges may at least partially overlap or may be substantially non-overlapping.

The method 1100 may obtain the calibration information by receiving an input from an operator. Additionally or alternatively, the method 1100 may obtain the calibration information by automatically selecting the calibration information. In some examples, the method 1100 may initially obtain the first calibration information and, based on determining that the parameter range of the downhole environment is different than the first parameter range, the method 1100 may then obtain the second calibration information.

At block 1106, the method 1100 may receive an output signal(s) from a sensor associated with the parameter (e.g., a pressure value) (block 1106) and, at block 1108, the method 1100 may use the obtained calibration information (e.g., the first calibration information or the second calibration information) to determine the parameter value based on the output signal received (block 1108). At block 1110, the method 1100 determines whether or not to end (block 1110).

Figure 12:
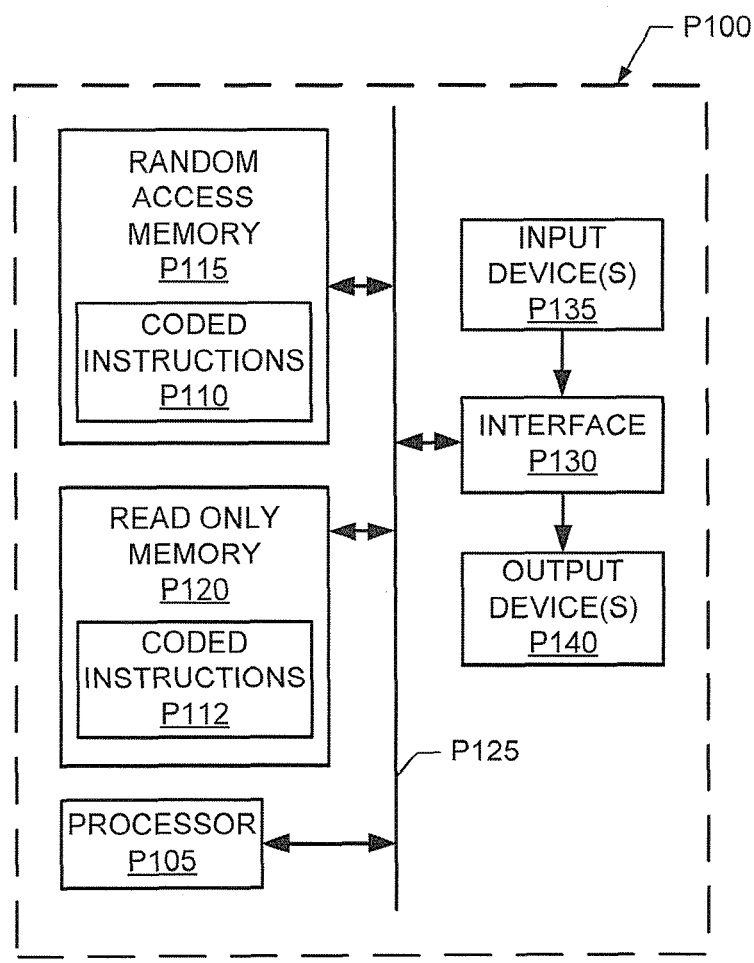
FIG. 12 is a schematic illustration of an example processor platform that may be used and/or programmed to implement any or all of the example systems and methods described herein.

FIG. 12 is a schematic diagram of an example processor platform P100 that may be used and/or programmed to implement to implement the logging and control computer 154 and/or any of the examples described herein. For example, the processor platform P100 can be implemented by one or more general purpose processors, processor cores, microcontrollers, etc.

The processor platform P100 of the example of FIG. 12 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P 125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

Using the examples described herein, relatively more accurate parameter values may be determined than if the same calibration information is used to determine the parameter value regardless of the parameter range of the wellbore. More specifically, different calibration information is used depending on the parameter range of the wellbore to substantially ensure the determination of higher accuracy parameter values (e.g., pressure values). In some examples, first calibration information (e.g., a first set of calibration coefficients) may be associated with a first parameter range and second calibration information (e.g., a second set of calibration coefficients) may be associated with a second parameter range. The parameter ranges may be different pressure and/or temperature ranges of the wellbore.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of determining a parameter value using calibration information, the calibration information corresponding to different parameter ranges in a downhole environment, comprising:
    determining a parameter range in the downhole environment using a controller;
    obtaining first calibration information or second calibration information based on the parameter range, the first calibration information associated with a first parameter range and the second calibration information associated with a second parameter range;
    receiving an output signal from a sensor associated with the parameter; and
    using the obtained calibration information to determine the parameter value based on the output signal received,
    wherein a first sensor is associated with the first calibration information and a second sensor is associated with the second calibration information.

2. The method of claim 1, wherein obtaining the first calibration information or the second calibration information comprises the controller automatically selecting the respective calibration information.

3. The method of claim 1, wherein obtaining the first calibration information or the second calibration information comprises the controller receiving an input from an operator.

4. The method of claim 1, wherein the first calibration information comprises first calibration coefficients and the second calibration information comprises second calibration coefficients.

5. The method of claim 1, wherein the first parameter range comprises a smaller range than the second parameter range.

6. The method of claim 5, wherein the first parameter range and the second parameter range are at least partially overlapping.

7. The method of claim 1, wherein the first parameter range and the second parameter range are substantially non-overlapping.

8. The method of claim 1, wherein the parameter comprises at least one of temperature or pressure.

9. The method of claim 1, wherein the first parameter range comprises a first temperature range and the second parameter range comprises a second temperature range.

10. The method of claim 1, wherein the first parameter range comprises a first temperature range and a first pressure range and the second parameter range comprises a second temperature range and a second pressure range.

11. A system to determine a parameter value in a downhole environment, comprising:
    a controller; and a sensor, at least one of the controller or the sensor associated with a first calibration coefficient and a second calibration coefficient, the first calibration coefficient corresponding to a first parameter range and the second calibration coefficient corresponding to a second parameter range different from the first parameter range, wherein, based on a parameter range of the downhole environment, the controller is to select one of the first calibration coefficient or the second calibration coefficient to be applied to an output signal received from the sensor to determine the parameter value, the output signal associated with the parameter, wherein the sensor comprises a first sensor associated with the first calibration coefficient and a second sensor associated with the second calibration coefficient.

12. The system of claim 11, further comprising a switch to select the first sensor or the second sensor based on the parameter range of the downhole environment.

13. The system of claim 11, wherein the parameter comprises at least one of temperature or pressure.

14. The system of claim 11, wherein the first parameter range comprises a first temperature range and the second parameter range comprises a second temperature range.

15. The system of claim 11, wherein the first parameter range comprises a first temperature range and a first pressure range and the second parameter range comprises a second temperature range and a second pressure range.

16. The system of claim 11, wherein the parameter range of the downhole environment is determined using the controller.

17. A downhole tool, comprising:
a controller disposed within a body of the downhole tool; and
a sensor, at least one of the controller or the sensor associated with a first calibration coefficient and a second calibration coefficient, the first calibration coefficient comprising a first parameter range and the second calibration coefficient comprising a second parameter range different from the first parameter range, wherein, based on a parameter range of the downhole environment, the controller is to select one of the first calibration coefficient or the second calibration coefficient to be applied to an output signal received from the sensor to determine a parameter value, the output signal associated with the parameter,
wherein the sensor comprises a first sensor associated with the first calibration coefficient and a second sensor associated with the second calibration coefficient.

18. The downhole tool of claim 17, wherein the downhole tool comprises a wireline formation tester.

\* \* \* \* \*